Figure 1:
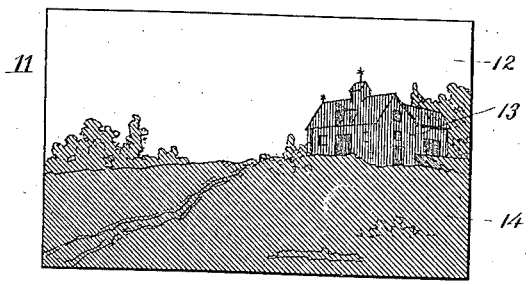

F. E. IVES.
COLOR PHOTOGRAPH OR FILM AND METHOD OF PRODUCING SAME.
APPLICATION FILED JULY 1, 1914.

1,170,540.

Patented Feb. 8, 1916.

Inventor:
Frederic E. Ives,
By his Attorneys,
Rogers, Kennedy & Campbell

UNITED STATES PATENT OFFICE.

FREDERIC E. IVES, OF WOODCLIFFE-ON-HUDSON, NEW JERSEY.

COLOR PHOTOGRAPH OR FILM AND METHOD OF PRODUCING SAME.

1,170,540.　　　　　　　Specification of Letters Patent.　　　Patented Feb. 8, 1916.

Application filed July 1, 1914. Serial No. 848,356.

*To all whom it may concern:*

Be it known that I, FREDERIC EUGENE IVES, a citizen of the United States, residing at Woodcliffe-on-Hudson, in the county of Bergen and State of New Jersey, have invented certain new and useful Improvements in Color Photographs or Films and Methods of Producing Same, of which the following is a specification, reference being had therein to the accompanying drawing.

This invention relates to color photographs or films and method of producing same.

The invention involves both the arts of color photography and motion pictures and constitutes an improvement in both arts.

In its broad aspect, related to the art of color photography, the object of the invention is to afford a simple and convenient mode of producing a multi-color picture or print. With relation to color motion pictures the object of the invention is to afford a film containing a single series of complete multi-color or composite transparent pictures, thus securing adaptability of the film to any ordinary motion picture machine without any special preparation or attachments thereto. In both aspects of the invention the novel method involved and also the product, that is to say, the picture or film, constitute part of the invention.

Other objects hereof will be elucidated in the hereinafter following description.

To the attainment of the above referred to objects the present invention consists in the novel processes, steps, products and other features hereinafter described.

First will be described one or more embodiments of the invention and thereafter the novel features will be pointed out in the claims.

Two or more simultaneously exposed views or series of views will be supposed to have been taken from substantially a single viewpoint for the purpose of securing color selection negatives from which afterward the positives or diapositives are to be made. The two-color system will be supposed to be employed, for, although the three-color system might be used, the two-color is eminently more simple and is sufficiently satisfactory for general practical purposes.

In exposing for the view or series of views constituting the subject, there may be a red screen interposed in the path of the light rays or in some other way a selection of the red rays made, and in connection therewith a film sensitized specially for red rays may be employed. Thus red-selection negatives are obtained. Similarly a green screen and green sensitive film may be employed for securing green selection negatives. Cameras have been devised for simultaneously making such exposures. For the purposes of motion pictures in color according to the present invention I propose to employ a pair of carefully matched motion picture cameras, the same coupled together by means of toothed wheel gears so as to operate in complete unison. I also prefer to employ in front of the pair of cameras a light-separating or image-displacing device, such, for example, as has been disclosed in prior application of mine, Serial Number 819,345, filed February 18, 1914, so that rays passing through one aperture or viewpoint are separated into two beams which are directed respectively to the traveling sensitive films of the two cameras. Also in addition to employing separate red and green glasses for the purpose of color selection I prefer to employ the novel dichroic reflector which has been disclosed and claimed in a prior application of mine, Serial Number 823,840, filed March 11, 1914, thus giving greater speed efficiency.

Having now the color selection negatives the procedure to secure the finished color picture or motion picture films is preferably to be as follows: Still assuming the two-color system, it will be understood that to make a composite positive the complements of the selected colors must be employed. Thus from the red selection negative I will preferably make a blue-green positive and combine with that a red positive made from the green selection negative. When I say red I mean any of the suitable reds and not necessarily a pure red; and the complementary positive may be a blue or a green or anything between them, and may be described as blue-to-green. In the preferred embodiment of the present improvement these two differently colored images are combined by producing them successively in the same identical layer. The layer may be one of gelatin and preferably the two images will be applied thereto by different methods of procedure. Thus I may proceed by first producing an ordinary black and white silver print in gelatin upon a suitable base, which will preferably be transparent celluloid in the case of motion picture films. This silver image may then be converted into a peacock blue color by treatment with potassium ferricyanid, then, after washing, by treatment with a dilute solution of ferric chlorid, followed, if desired, by clearing with sodium thiosulfate. The resulting color, which is known as Turnbull's blue, is satisfactory for the purposes of the two-color system. Or the conversion can be effected by immersion in a mixture of potassium ferricyanid, ferric ammonium citrate, and acetic acid in dilute solution, followed by clearing with sodium thiosulfate. We have thus secured the first of the two images to be combined and it is embodied in a layer of gelatin. For some purposes this first insoluble color image might be differently prepared, although the conversion of silver salt is preferred to the employment of an insoluble pigment otherwise produced in the gelatin. When this blue-green monochrome is sufficiently dry, the second color image will be combined with the first by producing it directly in the same gelatin layer and by a different mode from the production of the first image. I may proceed by first sensitizing the gelatin layer with potassium bichromate so as to prepare it for exposure under the green selection negative or series of negatives. One procedure might be to first simply expose the resensitized monochromes in proper registry under the green selection negatives; to thereafter immerse in water for removing the free bichromate from the gelatin; then immersing in an aqueous solution of a suitable dye, for example, eosin red, which thereupon is selectively absorbed and becomes mordanted by the chromium oxid, or whatever insoluble chromium compound it may be that is formed by exposure to light; and finally washing out the unmordanted dye so as to give the proper color gradations in the red image. We have thus combined the blue-green and the red images in a single layer and we have a multi-color picture. These will constitute a series of transparencies in the motion picture film and are ready to be passed through the projecting apparatus. Another procedure for combining the second image in the same layer with the first by dye absorption will be to expose the resensitized monochrome not under the green selection negatives, but under black and white diapositives made from the latter. By then washing out the unaffected bichromate and at the same time softening the unaffected gelatin, the red image may be produced by selective absorption by a brief period of dyeing in an aqueous solution of red dye, for example, by immersion, for one or two minutes in an acid solution of fast red or similar dye. Still another procedure for incorporating the second monochrome image with the first in the gelatin layer carrying the first would be by non-selective absorption, or "imbibition," of a previously created dye image. For example, the steps may be to prepare from the green selection negatives dye carriers in the form of gelatin reliefs which could be immersed in the red dye to selectively absorb color and thereafter applied against the gelatin carrying the blue-green monochrome so as to permit imbibition of the red image into the gelatin, for example, in accordance with pending patents of mine, Nos. 1,106,816, dated August 11, 1914, and 1,121,187, December 15, 1914.

If the three-color system be desired the above described process, while complete in itself, might be supplemented for the purpose of adding a third color either by applying another gelatin layer on the top of the two-color picture and incorporating the third image therein, or, in the case of a transparent film, by making provision for applying the third color at the rear or reverse side of the film; or after the second color has been introduced by either the first or second method described, the third color could be readily introduced into the gelatin by means of the third or imbibition method set forth.

A motion picture film made by the described process not only permits use in an unmodified projecting apparatus, but possesses the further advantages that the cost of producing the film is moderate, and, owing to the use of an aqueous dye, colors may be selected which will be consonant with the character or coloring of the subject.

Figure 2:
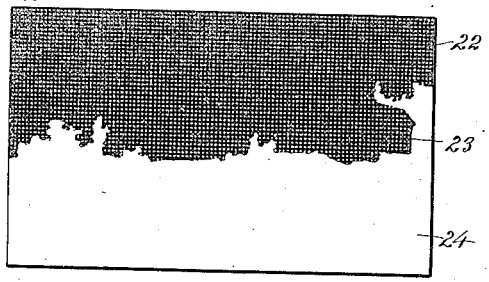
Figure 3:
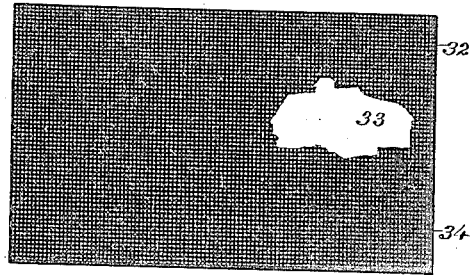
Figure 4:
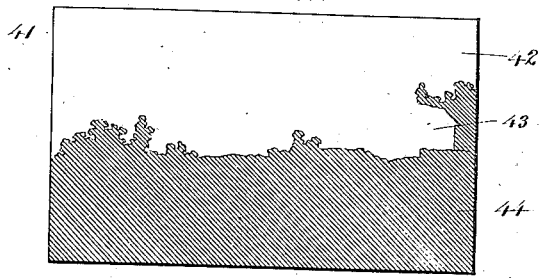
Figure 6:
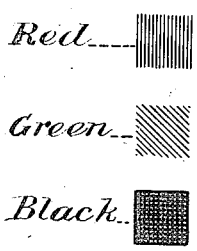
Figure 5:
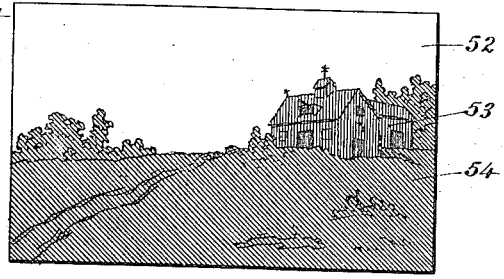

In the accompanying drawing Figure 1 shows the original view, or possibly a transparency; Fig. 2, a red-selection negative thereof; Fig. 3, a green-selection negative thereof; Fig. 4, a positive of blue-green color from the red-selection negative; Fig. 5, the print of Fig. 4 blended with a red positive from the green-selection negative; and Fig. 6, a chart of color indications.

The view 11, Fig. 1, has white portions 12, red portions 13, and green (or blue-green) portions 14. Exposure in the camera with a red screen interposed yields the red-selection negative 21, Fig. 2. This negative is black and white. The portions 22, corresponding with the white 12 in the original, are black, and so are the portions 23 corresponding with the red 13 in the original; while the portions 24 corresponding with the green 14 in the original are clear, since the green rays therefrom were excluded by the red screen. Similarly the green-selection negative 31, Fig. 3, has black portions 32 and 34 corresponding to the white and green in the original, and clear portions 33 corresponding to the red in the original. The two negatives 21 and 31 are well known in the art. The monochrome positive 41, Fig. 4, is made from the negative 21 but of complementary color, namely green. Therefore it has clear portions 42 and 43 corresponding with the original white and red, and green portions 44 corresponding with the original green. This monochrome 41 consists of a color image within the body of a colloid layer on a suitable carrier, preferably an insoluble image, such as converted silver, photographically produced directly from the negative 21. The succeeding monochrome image, produced by a different process, to be blended with the image 41, is produced either directly from negative 31, or indirectly, as described. When produced it is preferably a red soluble or dye image, and is introduced directly into the same colloid layer in registry with the green image 41 by absorption. This gives the final photograph or film 51, Fig. 5, in which the white portions 52 correspond with the portions 12, 22, 32 and 42, the red portions 53 with the portions 13, 23, 33 and 43, and the green portions 54 with the portions 14, 24, 34 and 44, in the previous figures. Colors other than red and green, such as yellow, would produce effects on both negatives 21 and 31, appearing as half tones or grays, and would yield blended green and red in the final print 51, thus approximating the original yellow.

In carrying out the hereinabove described three-color method in which three monochrome images are successively introduced into the same layer of colloid or gelatin, I prefer, as stated, to form the first image as an insoluble image, such, for example, as a converted silver image, and to produce the second image by selective absorption into the gelatin for example, by sensitizing, printing and dyeing, as stated, these first two images to be of blue-to-green and red colors respectively, and finally introducing a yellow image into the same layer of colloid by transfer of the same by imbibition from a dyed colloid relief or other dye-image-carrying member. By this procedure the gelatin layer is, through all its steps, maintained of uniform thickness so that none of the steps interferes with the others. The converted silver image is not subject to impairment by the production of the subsequent images. The selective absorption of the second image gives a sharp monochrome in register with the first image. Imbibition from a wet dry carrier would not give a sufficiently sharp blue or red image for motion pictures and its diffusion would be increased in the application of the final image. The final image, when of a yellow color, is satisfactorily introduced by imbibition from a wet carrier. Critical definition and sharpness is comparatively unimportant with the yellow component of the picture. This step does not impair the second image, which is adequately held in the colloid layer. The three-color method, photograph, and motion picture film above referred to, however, are not claimed herein, but are made the subject of claim in copending patent application Serial No. 66,839, filed December 14th, 1915.

It will thus be seen that a multi-color picture and a film for color motion pictures and the process of producing such picture and film have been described embodying the principles and attaining the objects and advantages of the present invention, and other advantages will be apparent to those skilled in the art. Since certain of the steps, details and other features may be modified without departing from the principles involved, no limitation to such features is intended excepting so far as set forth in the appended claims.

What is claimed is:

1. Method of producing a color photograph or color motion picture film from suitable color-selection negatives consisting in first forming one color image within the body of a given layer of material, and thereafter sensitizing, exposing and by a different process introducing another color image of different color into the body of the same layer of material in registry with the first image.

2. Method of producing a color photograph or color motion picture film from suitable color-selection negatives consisting in first photographically forming an insoluble blue-to-green image within the body of a given layer of material, and thereafter sensitizing said layer, exposing, and by absorption introducing a red image into the body of said layer in registry with the blue-to-green image.

3. Method of producing a color photograph or color motion picture film from suitable color selection negatives consisting in first photographically forming an insoluble color image within the body of a given layer of material, and thereafter photographically exposing and by absorption introducing a dye image of different color into the body of the same layer of material in registry with the first image.

4. Method of producing a color photograph or color motion picture film from suitable color-selection negatives consisting in first photographically forming an insoluble color image within the body of a given layer of material, and thereafter photographically exposing under a diapositive, washing and by absorption introducing a dye image of different color into the body of the same layer of material in registry with the first image.

5. Method of producing a color photograph or color motion picture film from suitable color-selection negatives consisting in first photographically forming a silver image within the body of a given layer of colloid material, converting the silver into an insoluble color, and thereafter sensitizing, exposing, washing and by selective absorption introducing a dye image of different color into the body of the same layer of material in registry with the first image.

6. Method of producing a color photograph or color motion picture film from suitable color-selection negatives consisting in first photographically forming a silver image within the body of a given layer of colloid material, converting the silver into an insoluble blue-to-green color, and thereafter sensitizing, exposing under a diapositive, washing out the sensitizing agent, and by selective absorption in an aqueous dye solution introducing a dye image of red color into the body of the same layer of material in registry with the first image.

7. Method of producing a color photograph or color motion picture film from suitable color-selection negatives consisting in first forming one color image within the body of a given layer of material, and thereafter by a different process introducing another color image of different color into the body of the same layer of material in registry with the first image.

8. Method of producing a color photograph or color motion picture film from suitable color-selection negatives consisting in first photographically forming an insoluble color image within the body of a given layer of material, and thereafter by absorption introducing a dye image of different color into the body of the same layer of material in registry with the first image.

9. Method of producing a color photograph or color motion picture film from suitable color-selection negatives consisting in first photographically forming a silver image within the body of a given layer of material, converting the silver into an insoluble color, and thereafter by a different process introducing a dye image of different color into the body of the same layer of material in registry with the first image.

10. Method of producing a color photograph or color motion picture film from suitable color-selection negatives consisting in first photographically forming a silver image within the body of a given layer of material, converting the silver into a blue-to-green insoluble color, and thereafter by absorption introducing a red dye image into the body of the same layer of material in registry with the first image.

11. Method of producing a transparent color photograph or color motion picture film from suitable color-selection negatives consisting in first photographically forming a silver image within the body of a given layer of colloid material, carried directly upon its final transparent carrying medium, converting the silver into an insoluble blue-to-green color, and thereafter by absorption introducing a red dye image into the body of the same layer of colloid material in registry with the first image.

12. A color photograph or color motion picture film comprising a colloid layer upon a suitable carrying base, and containing in the said layer an insoluble color photographic image, and also in registry therewith an image of soluble dye-stuff of a different color.

13. A color photograph or color motion picture film comprising a colloid layer upon a suitable carrying base, and containing in the said layer an insoluble converted-silver color photographic image, and also in registry therewith an absorbed image of soluble dye-stuff of a different color.

14. A color photograph or color motion picture film comprising a colloid layer upon a suitable carrying base, and containing in the said layer an insoluble blue-to-green converted-silver color photographic image, and also in registry therewith a selectively-absorbed image of soluble dye-stuff of a red color.

In testimony whereof, I have affixed my signature in presence of two witnesses.

FREDERIC E. IVES.

Witnesses:
DONALD CAMPBELL,
WM. J. DOLAN.